United States Patent [19]
Tsukushi et al.

[11] Patent Number: 5,012,051
[45] Date of Patent: Apr. 30, 1991

[54] THREE-PHASE COMMON CONTAINER-TYPE CIRCUIT BREAKER

[75] Inventors: Masanori Tsukushi; Osamu Koyanagi; Yasuharu Seki; Tokio Goto; Yukio Kurosawa, all of Hitachi, Japan

[73] Assignee: Hitachi, Ltd., Tokyo, Japan

[21] Appl. No.: 433,956

[22] Filed: Nov. 9, 1989

[30] Foreign Application Priority Data

Nov. 14, 1988 [JP] Japan ................................ 63-285690

[51] Int. Cl.⁵ ............................................. H01H 33/56
[52] U.S. Cl. ............................ 200/148 B; 200/148 R
[58] Field of Search ......................... 200/148 B, 148 R

[56] References Cited
FOREIGN PATENT DOCUMENTS
52-27562 3/1977 Japan ................................ 200/148 B Primary Examiner—Robert S. Macon
Attorney, Agent, or Firm—Antonelli, Terry, Stout & Kraus

[57] ABSTRACT

Breaker units (3, 4) of three-phases are enclosed in a common container (25). The three-phase breaker units and lead conductors (27a, 28a) connected to both ends of the breaker units are arranged on imaginary straight lines that are in parallel each other nearly passing through vertexes of an equilateral triangle. A common operation unit (7) for driving the three-phase breaker units is accommodated outside the container (25) and juxtaposed at a position opposed to one side (28b–28c) of the equilateral triangle. A zero-phase sequence current transformer (ZCT) is provided surrounding the lead conductors of three phases outside the container.

5 Claims, 4 Drawing Sheets

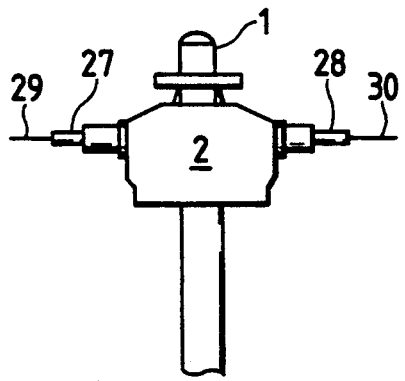
FIG. 1
PRIOR ART
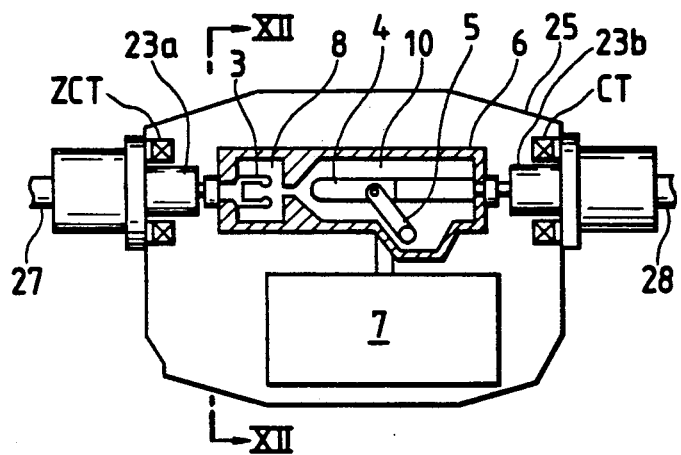
FIG. 2
PRIOR ART
FIG. 4
PRIOR ART
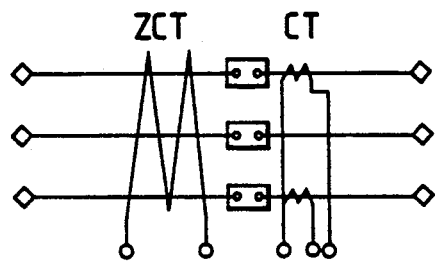
FIG. 5
PRIOR ART
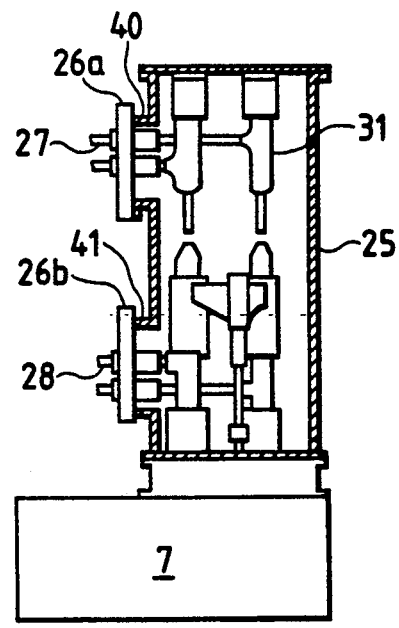
FIG. 3
PRIOR ART
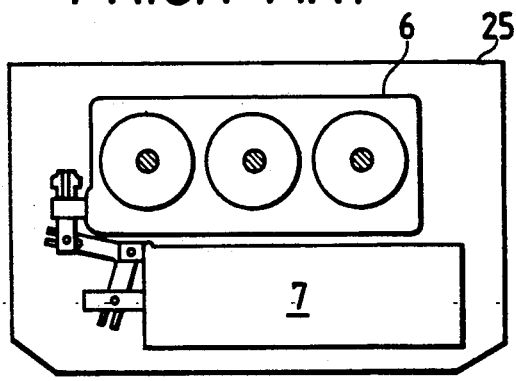

THREE-PHASE COMMON CONTAINER-TYPE CIRCUIT BREAKER

FIELD OF THE INVENTION

The present invention relates to a three-phase common container-type circuit breaker, and more specifically to a three-phase common container-type circuit breaker adapted to pole circuit breakers.

BACKGROUND OF THE INVENTION

A general three-phase common container-type circuit breaker can be represented by a cylindrical three-phase common tank-type circuit breaker that is employed for a transmission system of higher than 70 kV as shown in FIG. 5, namely in FIG. 1 of Japanese Patent Laid-Open No. 52-27562 distributed on Mar. 1, 1977 and entitled "Gas circuit breaker".

In this circuit breaker, the breaker units of three phases are arranged in the axial direction thereof in a cylindrical container 25 filled with an $SF_6$ gas, branch tubes 40, 41 are protruded in the radial direction at both ends in the axial direction of the cylindrical container 25, and lead conductors 27, 28 extending in the axial direction of the branch tubes are connected to insulating spacers 26a, 26b that hermetically seal the branch tubes, thereby to form a generally U-shaped current path 27-81-28.

Further, a similar example of three-phase common container-type circuit breaker shown in FIG. 5 can be represented by a cubic type pole switch 2 shown in FIG. 1. The pole switch 2 is constituted at an upper portion of a distribution pole 1 as shown in FIG. 1, and in which distribution lines 29 and 30 are connected to lead conductors 27 and 28 that are lead out nearly horizontally from both ends thereof. Details of the breaker units are constituted in a metal casing filled with the $SF_6$ gas as shown in FIG. 2 which is a vertical section view of FIG. 1 and as shown in FIG. 3 which is a section view along the line XII—XII in FIG. 2. An insulating cylinder 6 is coupled between a bushing 23a and a bushing 23b mounted on the metal casing 25, and is also filled with the $SF_6$ gas. The insulating cylinder 6 contains a fixed contact 3 and a moving contact 4 that are electrically connected to the bushings 23a and 23b, respectively, and the moving contact is opened or closed by an operation unit 7 in the metal casing 25 via a drive lever 5. In the insulating cylinder 6 are formed a heating chamber 8 in the vicinity of the fixed contact 3 and a downstream chamber 10 on the side of the moving contact 4. A zero-phase sequence current transformer ZCT for ground protection is arranged to surround three phases along the periphery of the bushing 23a in the metal casing 25, and another current transformer CT for over-current protection is arranged to surround the two-phase bushing 23b, thereby to constitute a sequence that is shown in FIG. 4. The breaker units of three phases are arranged in line in the horizontal direction in the insulating cylinder 6 of a unitary structure as shown in FIG. 3, and are operated by the operation unit 7.

In recent years, it has been studied to replace such a switch having a load current breaking ability only by a pole circuit breaker that has accident current breaking ability. This is because, by imparting accident current breaking ability, the section of power failure can be minimized in case of an accident and the accident can be restored very fast, contributing to strikingly improve reliability in supplying the electric power.

Under the above-mentioned circumstances, it has been studied to upgrade the pole switch shown in FIG. 2 to the pole circuit breaker that has accident current breaking ability, and to constitute the pole circuit breaker using the circuit breaker that is constituted as shown in FIG. 5.

When the conventional cubic type pole switch shown in FIGS. 1 to 3 is to be used as a pole circuit breaker having accident current breaking ability, the zero-phase sequence current transformer ZCT must be arranged at an end of the breaker unit as shown in FIG. 4. According to the conventional constitution in which the lead conductors 27 of three phases arranged horizontally and parallel in line are surrounded as shown in FIG. 2, however, the constitution is in no way desirable for the zero-phase sequence current transformer ZCT that detects ground current based on minute imbalance among the three-phase current, and the precision of detection must be further increased.

When the circuit breaker shown in FIG. 5 is used as a pole circuit breaker, furthermore, it can be contrived to arrange the zero-phase sequence current transformer ZCT in the vicinity of, for example, the insulating spacer 26a. However, the lead conductors 27 positioned at this portion have dissimilar lengths between two phases as shown. Furthermore, a length between support conductors 31 which support the fixed contact of the breaker unit and the lead conductors 27, and the zero-phase sequence current transformer ZCT is different from each other in each phase. Therefore, the constitution is not desirable for the zero-phase sequence current transformer ZCT that detects ground current based upon minute imbalance among the three-phase currents. Furthermore, it is contrived that distribution lines 29 and 30 are led out in a shape of L-type from the U-shaped current path 27-81-28 shown in FIG. 5. However, such an arrangement has same drawback explained in FIG. 5, since the distribution lines 29 and 30 of three phases are not arranged in straight lines but in the shape of the L-type. Accordingly, it is difficult to use the circuit breaker of FIG. 5 as the pole circuit breaker.

SUMMARY OF THE INVENTION

An object of the present invention is to provide a simply constituted three-phase common container-type circuit breaker having high sensitivity that can be used as a pole circuit breaker.

In order to achieve the above-mentioned object according to the present invention, lead conductors connected to both ends of breaker units of three phases are taken out linearly from both ends of the container in the axial direction nearly coaxially with the breaker units of three phases arranged in the container that accommodates the breaker units, the lead conductors of three phases are arranged nearly at vertexes of an equilateral triangle, and an operation unit that operates the breaker units of three phases is disposed at a position opposed to any side of the equilateral triangle.

The three-phase common container-type circuit breaker of the present invention is constituted as described above. Therefore, the lead conductors can be easily connected between the distribution lines that are positioned nearly in line. Furthermore, the lead conductors are positioned nearly at the vertexes of an equilateral triangle and the operation unit is disposed at a position opposed to one side of the equilateral triangle. Therefore, even when the operation rod common for the three phases is provided at the center of the triangle to operate them, insulation can be easily maintained between the operation rod and the lead conductors.

BRIEF DESCRIPTION OF THE DRAWINGS

FIG. 1 is a front view of a conventional cubic type pole switch;

FIG. 2 is a vertical section view illustrating major portions of FIG. 1;

FIG. 3 is a section view along the line XII—XII of FIG. 2;

FIG. 4 is a sequence diagram of the circuit breaker shown in FIG. 1;

FIG. 5 is a side view showing in vertical cross section of a conventional cylindrical tank three-phase common container-type circuit breaker;

DETAILED DESCRIPTION OF THE PREFERRED EMBODIMENTS

Figure 6:
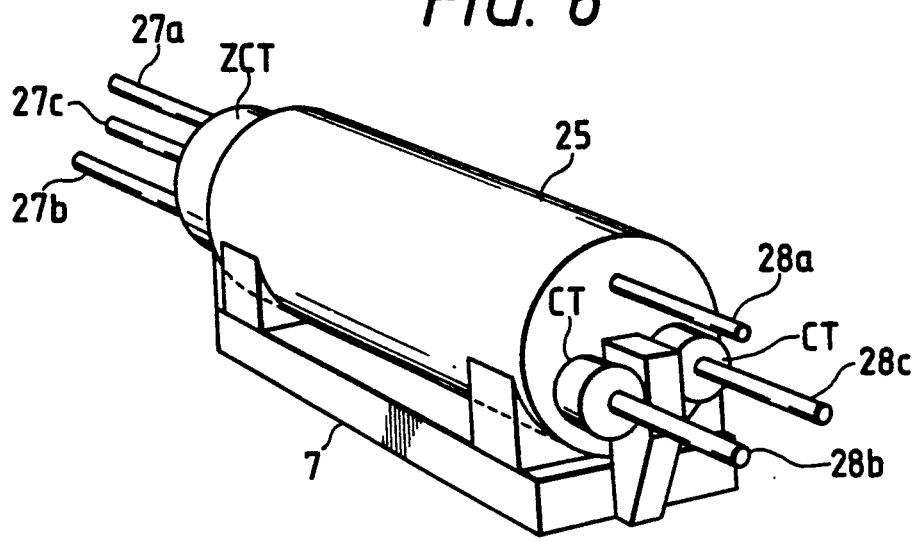
FIG. 6 is a perspective view of a three-phase common container-type circuit breaker according to the first embodiment of the present invention.

Referring to FIG. 6, the container 25 containing the breaker units is a cylinder made of an insulating material, and lead conductors 27a, 27b, 27c and lead conductors 28a, 28b, 28c connected to both ends of the breaker units are arranged on the same axes. The axes of these lead conductors are in parallel with the axis of the cylindrical container 25. The lead conductors 27a, 27b, 27c and lead conductors 28a, 28b, 28c of three phases are positioned nearly at the vertexes of an equilateral triangle, and an operation unit 7 is provided at a position opposed to the side between the lead conductors 28b and 28c in the diagramed case. A zero-phase sequence current transformer ZCT is provided to surround the lead conductors 27a, 27b and 27c, and a current transformer CT is provided to surround the lead conductors 28b and 28c, thereby to constitute a sequence that is shown in FIG. 4.

Figure 7:
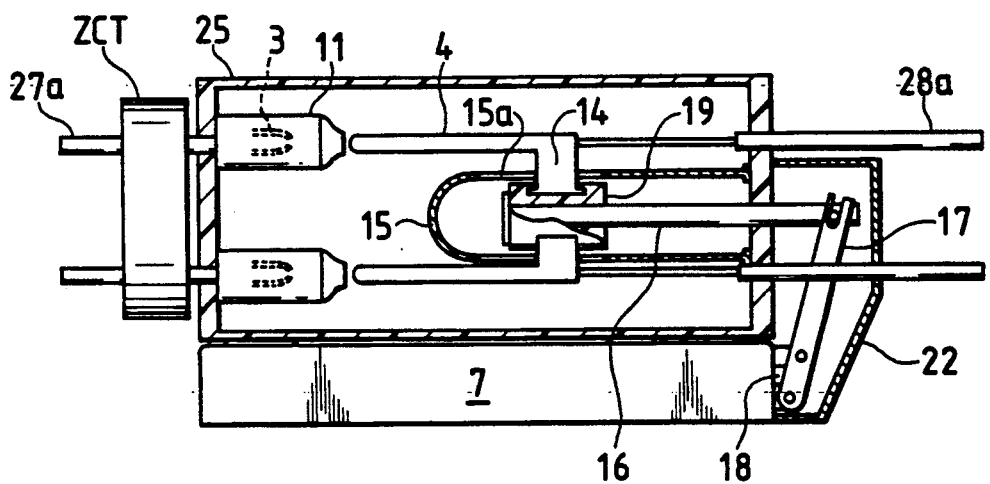
FIG. 7 is a front view in vertical cross section of FIG. 6.

Referring to FIG. 7, the cylindrical container 25 is filled with the SF6 gas and constitutes breaking units of three phases. However, since the breaking units all have the same constitution, the breaking unit of one phase only will now be described. The lead conductors 27a and 28a positioned on the same axis extend from both ends of the cylindrical container 25 in the axial direction, and a breaking unit having a fixed contact 3 and a moving contact 4 is constituted on this axis. An insulating cylinder 11 that forms a heating chamber 8 shown in FIG. 2 is provided at a contacting portion of the two contacts 3 and 4, and the insulating cylinder 11 having the downstream chamber 10 shown in FIG. 2 is enclosed in the container 25. An end of the lead conductor 28a in the container 25 is fitted maintaining electric contact to the moving contact 4. When the moving contact 4 moves rightwards to break the circuit, the left end of the lead conductor 28a is inserted in the hollow cavity of the moving contact 4. As described above, the fixed contacts 3 of three phases are positioned nearly at the vertexes of an equilateral triangle, and a common insulating support member 19 is disposed at a position that corresponds to the center of the equilateral triangle. An end of an arm 14 that is formed together with the moving contacts 4 of three phases as a unitary structure and an end of an operation rod 16 are molded as a unitary structure to the common insulating support member 19. A metallic shield 15 that is arranged to surround the above portion is supported by the container 25 in order to protect the insulation among the three phases from a hot gas that generates when the current is interrupted by the breaker units. The shield 15 has slits 15a formed therein to prevent electric contact to the arms 14 of three phases, the slits 15a being formed in an elongated shape in the axial direction to interrupt the electric contact over the whole stroke of the opening and closing operations of the moving contact 4. The operation rod 16 extends beyond the container 25 maintaining airtightness and is coupled to an end of a link 17. A drive shaft 18 which gives rotational force to the link 17 is coupled to an operation unit 7 that is not described here in detail.

Therefore, if a rotation in the counterclockwise direction is given to the link 17 from the operation unit 7 via the drive shaft 18, the moving contact 4 comes into contact with the fixed contact 3 to make the circuit.

Figure 8:
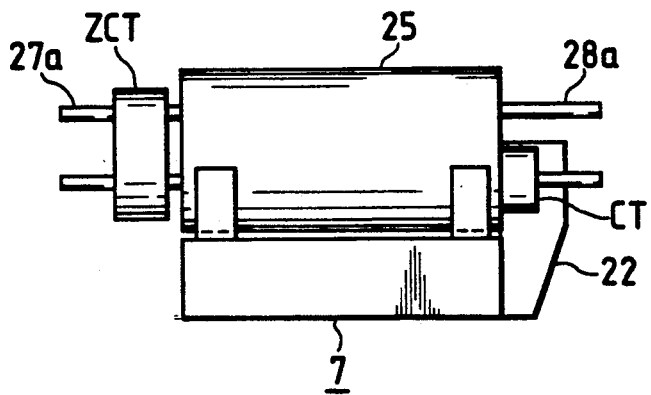
FIG. 8 is a front view of FIG. 6.
Figure 9:
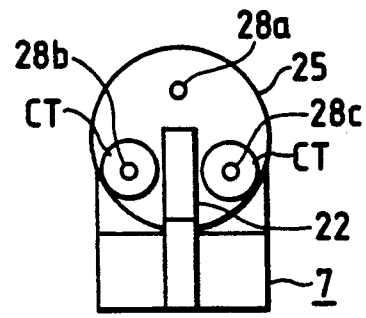
FIG. 9 is a side view of FIG. 6.

The mechanism constituted by the link 17 is contained in the mechanism casing 22. Here, neither the mechanism casing 22 nor the link 17 adversely affects electric insulation of the lead conductors 28a, 28b and 28c. This is because, the operation unit 7 is arranged being opposed to one side of an imaginary equilateral triangle connecting the lead conductors 28b and 28c together as will be understood from FIGS. 6 and 9. Owing to this arrangement, the link 17 and the mechanism casing 22 are allowed to be located between the lead conductors 28b and 28c. Thus, even when the container 25 and the operation unit 7 are combined together as shown in FIG. 8 which is a front view of FIG. 6, the constitution as a whole is simple and is small. The downstream chambers 10 of FIG. 2 for the breaker units of three phases are formed by utilizing the whole space in the container 25. Therefore, the device as a whole never becomes bulky even when the volume of the downstream chamber is increased to improve breaking performance. Furthermore, since the two lead conductors 27 and 28 are located on the same axis, the device is well suited for being used as a pole circuit breaker connected between the distribution lines 29 and 30 as shown in FIG. 1. Since the lead conductors 27a, 27b and 27c inclusive of the breaker units are arranged at vertexes of the imaginary equilateral triangle, the conductors of three phases are arranged symmetrically for the zero-phase sequence current transformer ZCT and sensitivity for detecting the zero-phase current can be increased.

In the above-mentioned embodiment, the airtightness in the container 25 is maintained relative to the operation rod 16. However, the container 25 and the mechanism casing 22 may share the same gaseous space as is usually done in the circuit breakers of this kind.

Figure 10:
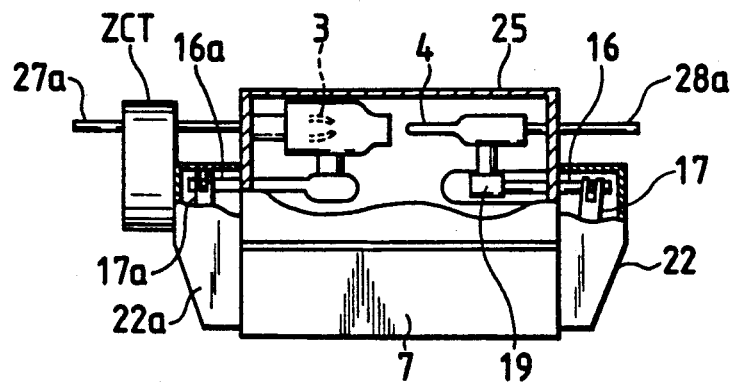
FIG. 10 is a partial sectional front view of three-phase common container-type circuit breaker according to the second embodiment of the present invention.

Referring to FIG. 10, the moving contact 4 of the breaker unit is constituted in the same manner as the aforementioned embodiment. However, the contact 3 in FIG. 3 is allowed to move, although the contact 3 in FIG. 2 is a fixed contact. FIG. 10 illustrates one phase. The operation rod 16a that maintains electric insulation among the phases is also coupled to the fixed contacts 3, and is coupled to the operation unit 7 via the link 17a in the mechanism casing 22a to open or close the contact. 19 denotes a fastening of the moving contact 4 to the operation rod 16.

According to the embodiment shown in FIG. 10, increased freedom is offered for setting the breaking stroke characteristics in the breaker unit compared with the case of the aforementioned embodiment shown in FIGS. 6–9, and the breaking performance can be enhanced.

Figure 11:
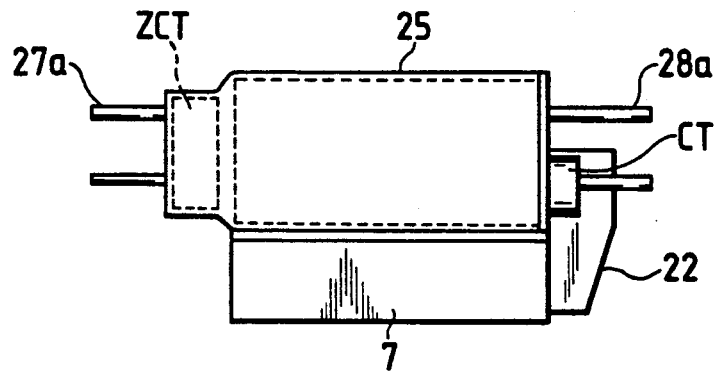
FIG. 11 is a front view of three-phase common container-type circuit breaker according to the third embodiment of the present invention.

Referring to FIG. 11, the zero-phase sequence current transformer ZCT and the container 25 are molded as a unitary structure, and the length of the container 25 in the axial direction can be shortened compared with that of the embodiment of FIG. 8.

Figure 12:
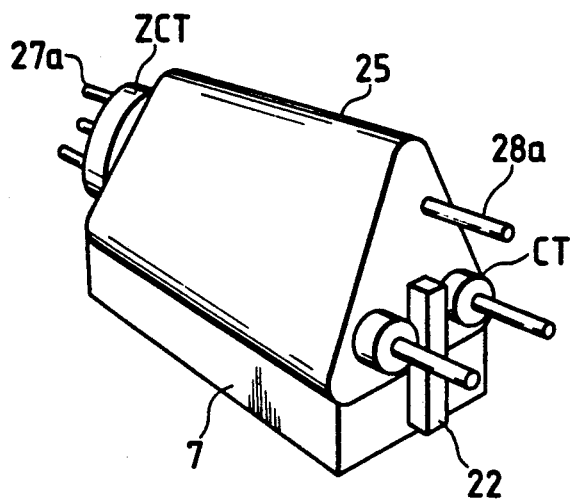
FIG. 12 is a perspective view of a three-phase common container-type circuit breaker according to the 4th embodiment of the present invention.
Figure 13:
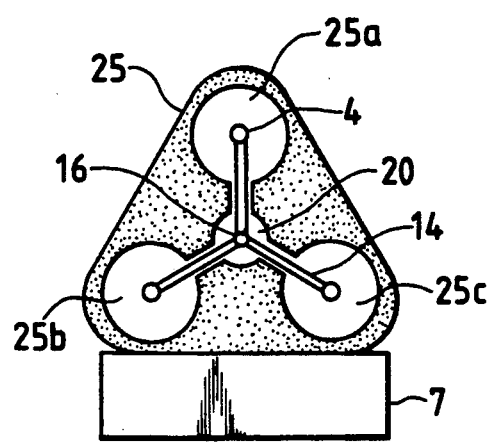
FIG. 13 is a vertical section side view of FIG. 12.

Referring to FIGS. 12 and 13, the formation of the container 25 for accommodating the breaker units thereof is different from that shown in FIG. 6. The container 25 shown in FIGS. 12 and 13 has three storage spaces 25a, 25b and 25c for enclosing the breaker units of three phases and the lead conductors connected to the breaker units extending straightly along the axial direction of the container at vertexes of an imaginary equilateral triangle as shown in FIG. 13. A common hole 20, which is connected to the storage spaces and filled with the SF$_6$ gas, is formed in a central portion to arrange the operation rod 16 shown in FIG. 13. The moving contacts 4 of three phases and the operation rod 16 are connected by the insulation arms 14.

Figure 14:
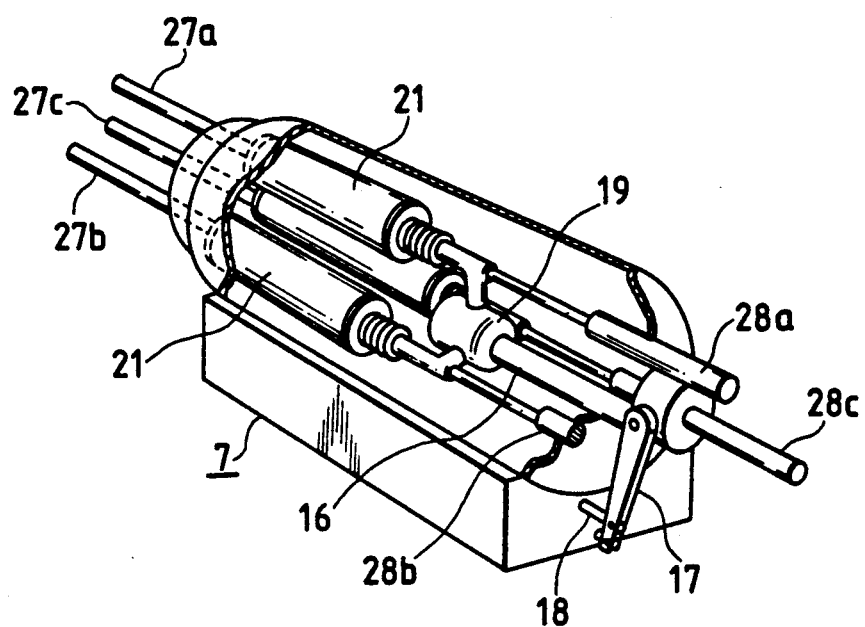
FIG. 14 is a perspective view showing partly in cross section of a three-phase common container-type circuit breaker according to the 5th embodiment of the present invention.

As the voltage class becomes higher, the hot gas at the time of breaking the current may affect insulation among the phases. According to this embodiment, however, the breaker units of each of the phases are arranged in the accommodation portions 25a, 25b and 25c that are separated from each other to some extent, and insulation among the phases is not affected. The breaker units shown in FIG. 14 is different from that shown in FIG. 7 in its breaker units. The breaker units shown in FIG. 7 is so-called heat puffer type. The breaker unit of FIG. 14, however, consists of a vacuum bulb 21 for a vacuum circuit breaker. The vacuum bulb 21 has a moving contact and a fixed contact that are arranged being opposed to each other in a sealed container. Unlike the preceding embodiment shown in FIG. 7, therefore, no countermeasure is necessary against the hot gas, and the shield 15 of FIG. 7 can be omitted. The right ends of the lead conductors 27a, 27b and 27c are connected to the fixed contacts of the vacuum bulbs 21 and the left ends of the lead conductors 28a, 28b and 28c are connected to the moving contacts of the vacuum valves 21. The constitution in other respects is the same as that of FIG. 7, and exhibits nearly the same effects.

In the foregoing embodiments, the container 25 was made of an insulating material. The container 25, however, may be made of a metal if bushings are used for taking out the lead conductors from both ends.

According to the present invention as explained in the foregoing, the breaker units of three phases in the container are arranged at the vertexes of an imaginary equilateral triangle, the lead conductors connected to both ends of the breaker units are arranged on the axes of the breaker units and are drawn from the container, and the operation unit is disposed at a position opposed to one side of the imaginary equilateral triangle. Therefore, there is obtained a three-phase common container-type circuit breaker adapted to being used on a pole, the circuit breaker as a whole being simply constructed and in small size, and enabling the conductors of three phases to be symmetrically arranged with respect to the zero-phase sequence current transformer such that ground current can be detected maintaining improved sensitivity based on balance in the currents.

What we claim is:

1. A three-phase common container-type circuit breaker in which breaker units (3, 4) of three phases are accommodated in a common container (25), both ends of each of these breaker units are extended out of the container via lead conductors (27a, 27b, 27c, 28a, 28b, 28c), and a common operation unit (7) for driving the breaker units of three phases is provided on an outside of the container, wherein said breaker units of three phases and said lead conductors at both ends thereof are arranged on imaginary straight lines that are in parallel each other nearly passing through vertexes of an equilateral triangle, and said operation unit is juxtaposed at a position opposed to one side (28b–28c) of said equilateral triangle.

2. A three-phase common container-type circuit breaker according to claim 1, wherein a zero-phase sequence current transformer (ZCT) is provided on the outside of said container to surround said lead conductors of three phases of one side.

3. A three-phase common container-type circuit breaker according to claim 1, wherein an operation rod (16) is provided at a central portion of said equilateral triangle, one end of the operation rod being coupled, maintaining electric insulation, to moving contacts (4) of said breaker units of three phases, and another end of said operation rod being coupled to said operation unit.

4. A three-phase common container-type circuit breaker according to claim 1, wherein said container is made of an insulating material which has storage spaces (25a, 25b, 25c) for enclosing said breaker units of three phases and the lead conductors connected to said breaker units and extended straightly along an axial direction thereof and has a common hole (20) for surrounding the operation rod (16, 16a) approximately arranged at a center of said equilateral triangle and connecting to the storage spaces, and said operation rod and the moving contacts (4; 4,3) are connected by arms (14) which are arranged between said storage spaces and said common hole and coupled to said operation rod and the moving contacts maintaining electric insulation, respectively.

5. A three-phase common container-type circuit breaker according to claim 1, wherein at a central portion of said equilateral triangle are provided a first operation rod (16) of which one end is coupled maintaining electric insulation to one moving contact (4) of said breaker units of three phases and a second operation rod (16a) of which another end is coupled maintaining electric insulation to another moving contact (3) of said breaker units of three phases, and other ends of two operation rods are coupled to said operation unit, respectively.

* * * * *